Figure 1:
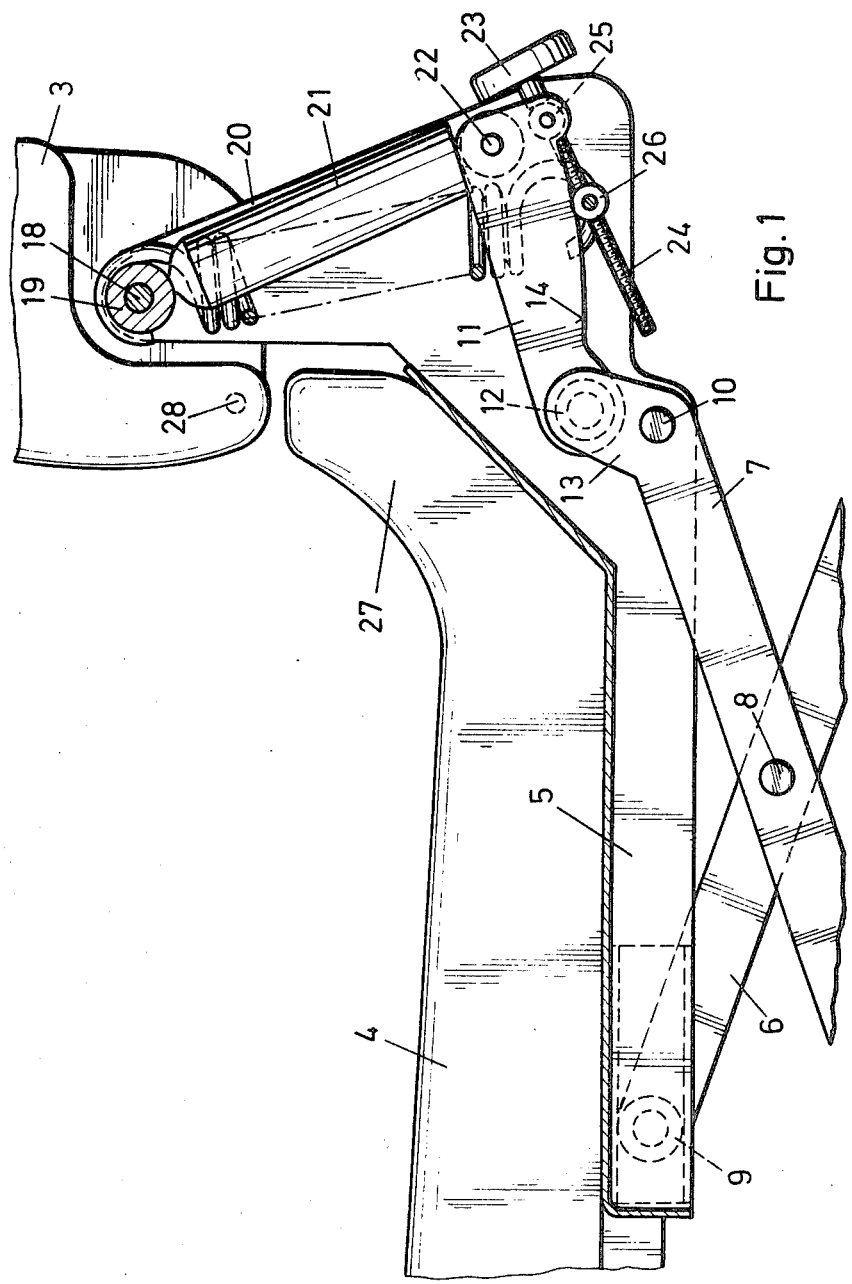

United States Patent [19]

Grass et al.

[11] 4,181,353
[45] Jan. 1, 1980

[54] VEHICLE SEAT

[75] Inventors: Gerd Grass, Detmold; Jorg Hettich, Lemgo, both of Fed. Rep. of Germany

[73] Assignee: Gebr. Isringhausen, Lemgo, Fed. Rep. of Germany

[21] Appl. No.: 874,337

[22] Filed: Feb. 1, 1978

[30] Foreign Application Priority Data

Feb. 7, 1977 [DE] Fed. Rep. of Germany ....... 2704921

[51] Int. Cl.² ............................................. A47C 3/00
[52] U.S. Cl. ................................... 297/307; 248/564
[58] Field of Search ............. 248/157, 399, 400, 421, 248/423; 297/307–309, 345; 108/117, 145

[56] References Cited

U.S. PATENT DOCUMENTS

| | | | |
|---|---|---|---|
| 2,562,041 | 7/1951 | Keller et al. | 297/307 |
| 3,163,466 | 12/1964 | Radke et al. | 297/307 |
| 3,572,828 | 3/1971 | Lehner | 248/399 X |
| 3,761,045 | 9/1973 | Sturhan | 248/399 |
| 3,888,451 | 6/1975 | Lacey | 248/399 |

*Primary Examiner*—James C. Mitchell
*Attorney, Agent, or Firm*—Salter & Michaelson

[57] ABSTRACT

A resiliently-mounted vehicle seat has a resilient damped mounting between the seat frame and an underframe. The mounting seeks to avoid a construction which impedes up and down movement of the seat frame and tilting of a back rest pivotally connected to said seat frame.

The seat frame is supported from the underframe by a scissors linkage and the scissors linkage includes an extension of one of the links which projects beyond the pivot for that link and carries a shock absorber. A cam surface is formed by the extension and a spring is carried on a shaft movable over the cam surface. The other end of the shock absorber and of the spring are carried on shafts mounted on an extension of the seat frame or the underframe.

A feature of the arrangement is the facility to adjust the spring for different occupants with minimal force.

6 Claims, 2 Drawing Figures

VEHICLE SEAT

This invention relates to vehicle seats of the kind in which a seat frame which carries the seat cushion is supported on an underframe by scissors linkages arranged at the sides of the seat, the underframe being fixed to the floor of a driving cab. Hitherto spring and damping units have been situated between the scissors levers linkages either below the seat frame or behind the back rest of the seat. Both arrangements are disadvantageous. When the unit is below the seat it impedes full oscillatory movement of the scissors linkages. When the unit is behind the back rest it interferes with the desired adjustability of the inclination of the back rest.

An object of the invention is to provide an arrangement for vehicle seats of this kind which makes it possible to fit a spring and damping unit in such a way that it does not interfere with either the complete retraction of the scissors linkages or adjustment of the inclination of the back rest.

According to the invention a resiliently-mounted vehicle seat comprises a seat frame, a seat cushion carried by the seat frame, an underframe, a scissors linkage at each side of the underframe supporting the seat frame from the underframe, a pivot pin connecting the links of each scissor linkage at their point of intersection, at least one of the scissors linkages having an extension piece on one of its links which extends from a pivot by which said link is pivotally attached to the seat frame or the underframe, a shock absorber extending between the free end of the extension piece and a first shaft rotatably mounted on the associated frame, a cam surface formed on the extension piece, a slidable shaft movable along the cam surface, and a tension spring pivotally attached at one end to the slidable shaft and at the other end to a second rotatable shaft carried on the associated frame, whereby a spring and damping arrangement is provided between the seat frame and the underframe.

The arrangement of the extension piece may be either that the shock absorber and the tension springs are arranged in the region of an upper rearward pivot for the linkages mounted on the seat frame, or in the region of a lower forward pivot for the linkages mounted on the underframe. In the first alternative the constructional components are situated behind the rear part of the seat cushion and occupy only the available space to the rear of that part of the seat which serves to support the pelvis of the occupant of the seat. In the second alternative the constructional components are preferably situated behind the feet of the occupant of the seat in the case where a wheel casing projects from the floor of the driving cab leaving a wedge-shaped space between the wheel casing and the feet of the occupant of the seat.

In both the above mentioned arrangements the space below the seat frame is completely free from the mechanism of the spring and damping arrangement so that the seat can move downwards an optimum distance and the mechanism is particularly suitable for mounting in driving cabs where low assembly heights are required. Adjustment of the inclination of the back rest of the seat is also unimpeded even when the spring and damping arrangement is located to the rear of the seat. A particularly large tilting of the back rest can be produced.

By the arrangement of the invention it is possible to make the extension piece relatively long. A large damping stroke can thus be produced which results in low damping forces and a low loading of the constructional components including the loading of the tension spring to support the weight of the occupant.

In known seat designs the pre-stress in the tension spring can be changed when the weight of the seat occupant changes. This requires the use of considerable force if it is desired to avoid excessive force transfer in pre-stressing the spring. In the seat according to the invention the pre-stress in the tension spring is not altered in order to adjust for different weights. The effective length of the extension piece is altered by pushing the pivot of the tension spring along the cam surface. According to one embodiment of the invention the cam surface is formed as a circular arc having as its axis the axis of pivoting of the upper end of the tension spring. Thus there is no change in the pre-stress in the tension spring during an adjustment of the spring and damping unit for a different weight of the seat occupant but only the effective lever arm of the tension spring is altered, for which only a small force has to be exerted. The design of the cam surface as a circular arc has the additional advantage that the seating surface of the seat remains at a constant height after adjustment for different weight of occupants.

Figure 2:
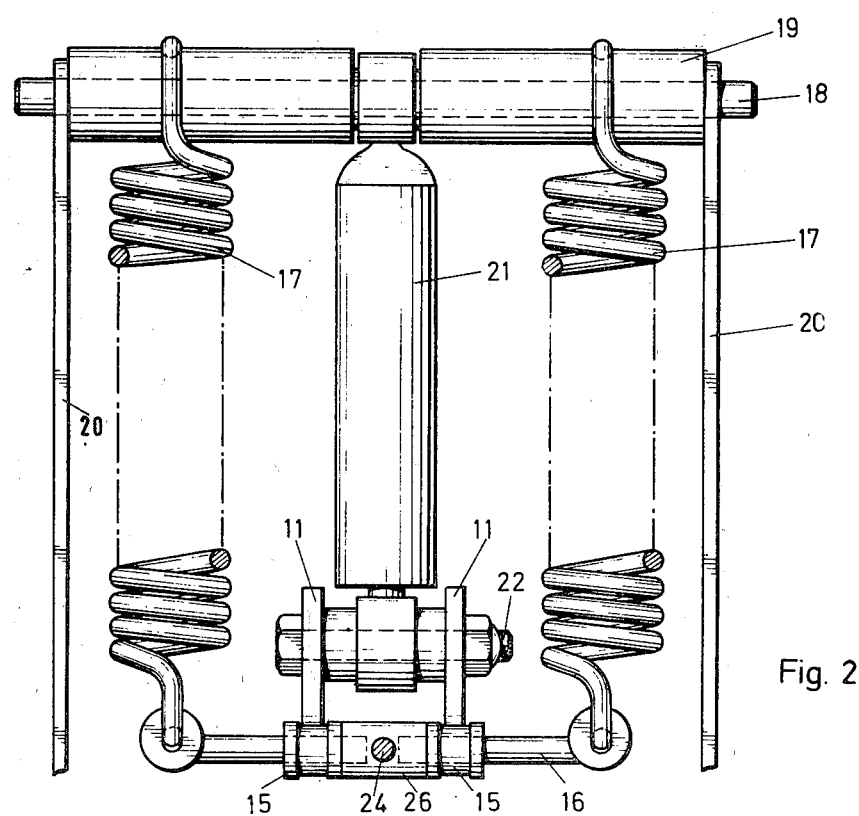

One embodiment of the invention is now described by way of example and with reference to the drawings in which:

FIG. 1 is a partial sectional side view of a resiliently-mounted vehicle seat according to the invention, and FIG. 2 is a rear view of a springing and damping unit of the seat of FIG. 1.

Referring to the drawings the vehicle seat includes a back rest 3 and a seat cushion 4 is mounted on a seat frame 5. The seat frame is supported on an underframe (not shown) suited to the construction of the particular vehicle by means of scissors linkage including links 6 and 7, one linkage being arranged at each side of said seat frame and the links being connected together at their points of intersection by means of a pivot pin 8. The upper ends of the links 6 are provided with rollers 9 which are each mounted in bearings in a channel-section part of the seat frame 5. At its upper end each link 7 pivots relative to the seat frame 5 by means of a pivot pin 10.

The links 7 are extended outward beyond the pins 10 by means of extension pieces 11. In the illustrated embodiment there are two extension pieces 11 which are parallel to each other (FIG. 2) and are welded together onto a tube 12. The tube 12 connects the extension pieces 11, arranged approximately centrally of the seat, rigidly to extension piece 13 of the externally situated links 7.

The extension pieces 11 are each formed with a cam surface 14 on the underside in the form of an arcuate shaped edge. On these cam surfaces 14 rollers 15 are engaged which are mounted to rotate freely in bearings on a bar 16 on each of which a tension spring 17 is pivotally mounted.

The upper ends of the tension springs 17 are fixed to an upper shaft 18 by means of movable sleeves 19. The shaft 18 is mounted in bearings on upward extending side walls 20 of the seat frame 5. The shaft 18 also serves to pivotally support a shock absorber 21 which is connected to pivot at its lower end with the extension pieces 11 by means of a pivot pin 22, and this connection also fixes the position of the extension pieces 11 at its outer end.

A spindle 24, which is mounted to rotate in a bearing 25 is situated between the extension pieces 11 and can be rotated by means of a hand wheel 23. The spindle 24 extends by means of a running nut 26 between the two rollers 15 that are engageable with the cam surfaces 14. By means of the hand wheel 23, it is possible in this way to alter the lower pivot axis of the tension springs 17 relative to the extension pieces 11 in a very simple manner and without the exertion of any appreciable force by means of the hand wheel 23. Since the cam surfaces 14 are formed with an arcuate configuration with the shaft 18 as the axis of the radius of curvature thereof the pre-stressing of the tension spring 17 is not altered by this action. In a similar manner it is possible to use, in place of the hand wheel 23 and the spindle 24, a Bowden wire or similar device to move the rollers 15 on the cam surfaces 14.

It can be seen from FIG. 1 that the spring and damping unit fits completely into the pelvic wedge of the vehicle seat to the rear of the seat cushion and requires no additional space beyond that normally occupied by the seat. Moreover the mechanism does not interfere either with the full oscillation of the scissors linkage 6 and 7 or with the adjustment of the inclination of the back rest 3. In the example illustrated the pivot for adjusting the back rest angle is mounted in bearings in side mountings of the seat (not shown) and is aligned coaxially with the shaft 18 on which the shock absorber 21 and the tension springs 17 are carried. As a result the back rest 3 can be inclined backwards as far as is desired without interference from the spring and damping unit. If the base of the back rest is symmetrical then inclination in the forward direction can also occur in a similar way in order to tilt the back rest forward onto the seat cushion 4. However, in the illustrated embodiment the front cushion of the back rest 3 extends further downwards and butts against a seat wedge 27 which supports the pelvis of the seat occupant. In order to be able to produce forward tilt of the back rest 3 onto the seat cushion 4 an auxiliary shaft 28 is provided in front of, and parallel to the shaft 18 and the shaft 28 is also mounted in bearings in the side mountings of the seat. The mountings of the shaft for tilting the back rest and of the auxiliary shaft 28 in the side mountings are releasable at will, that is to say during tilting of the back rest forward onto the seat cushion 4, the mounting of the shaft of the back rest in the side mountings is released and the back rest 4 is swung about the auxiliary shaft 28.

What we claim as our invention and desire to secure by Letters Patent of the United States is:

1. A resiliently-mounted vehicle seat, comprising a seat frame, a seat cushion carried by said seat frame, an underframe joined to said seat frame, a scissors linkage located at each side of said underframe and supporting the seat frame from said underframe, each of said scissors linkages including pivotally connected links, a pivot pin connecting the links of each scissors linkage at their point of intersection, at least one of the scissors linkages having an extension piece joined to one of its links that projects rearwardly from a pivot by which the last named link is pivotally attached to said seat, a shock absorber extending between the free end of the extension piece and a first shaft that is rotatably mounted on said seat frame and that is spaced from said extension piece, said extension piece having a cam surface formed thereon, a slidable shaft engaging and movable along said cam surface, and a tension spring pivotally attached to the slidable shaft and to said first shaft and defining with said shock absorber a spring and damping unit that is adjustable by said slidable shaft to provide for location of said seat frame in accordance with the occupant of said seat.

2. A resiliently-mounted vehicle seat, comprising a seat frame, a seat cushion carried by said seat frame, an underframe joined to said seat frame, a scissors linkage located at each side of said underframe and supporting said seat frame from said underframe, each of said scissors linkages including pivotally connected links, a pivot pin connecting the links of each scissors linkage at their points of intersection, at least one of said scissors linkages having an extension piece on one of its links which extends from a pivot by which said link is pivotally attached to said underframe, a shock absorber extending between the free end of said extension piece and a first shaft that is rotatably mounted on said underframe, a cam surface formed on said extension piece, a slidable shaft engaging and movable along said cam surface, and a tension spring pivotally connected to said slidable shaft and defining a spring and damping unit that is adjustable by said slidable shaft to provide for location of said seat frame in a desired position regardless of the occupant of said seat.

3. A vehicle seat according to claim 1, said extension piece, said shock absorber and said tension spring being located rearwardly of said seat cushion and being constructed in a manner to occupy only the space at the rear of the part of said seat in which the pelvis of the occupant of said seat is located.

4. A vehicle seat according to claim 1, said cam surface having an arcuate configuration, the axis of the radius of curvature of which is defined by said first shaft.

5. A vehicle seat according to claim 1, a back rest pivotally connected to said seat frame by a second shaft, said first shaft being spaced from said second shaft such that the inclination of said back rest is easily adjusted.

6. A vehicle seat according to claim 4, said second shaft being located in front of and below the pivot for adjusting the inclination of said back rest, wherein said back rest is pivotal forwardly onto said seat cushion.

* * * * *